[11] 3,601,470

| [72] | Inventor | Lawrence A. Juhlin, Jr.<br>Greenville, Ill. |
|---|---|---|
| [21] | Appl. No. | 869,824 |
| [22] | Filed | Oct. 27, 1969 |
| [45] | Patented | Aug. 24, 1971 |
| [73] | Assignee | General Electric Company |

[54] LIGHT VALVE PROJECTION SYSTEM EMPLOYING COAXIAL BEAMS OF COLORED LIGHT
4 Claims, 5 Drawing Figs.

[52] U.S. Cl............................................. 350/161,
178/5.4 BD, 178/7.86, 350/162 SF, 350/172
[51] Int. Cl....................................................G02b 27/38,
G02f 1/32
[50] Field of Search........................................... 350/161,
162, 162 SF; 178/5.4 BD

[56] References Cited
UNITED STATES PATENTS
| 3,118,969 | 1/1964 | Glenn, Jr. | 350/161 X |
|---|---|---|---|
| 3,265,811 | 8/1966 | Ellis | 350/161 X |

*Primary Examiner*—John K. Corbin
*Attorneys*—Marvin Snyder, W. J. Shanley, Jr., Thomas A. Briody, Frank L. Neuhauser, Oscar B. Waddell and Joseph B. Forman ABSTRACT: In a system for projecting images in color produced by light passing through optical diffraction gratings formed in a deformable medium, gratings formed along each of two different directions are illuminated with light of two different colors. By deployment of dichroic mirrors in the light path, light of both colors are superimposed and directed coaxially along an optic axis of the system onto the deformable medium, thereby achieving an improvement in quality of the projected image.

PATENTED AUG 24 1971 3,601,470
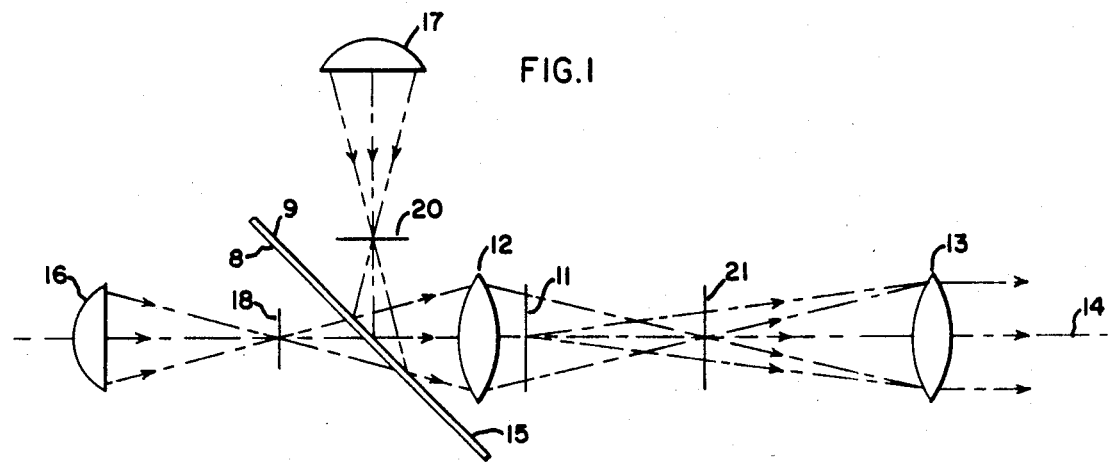
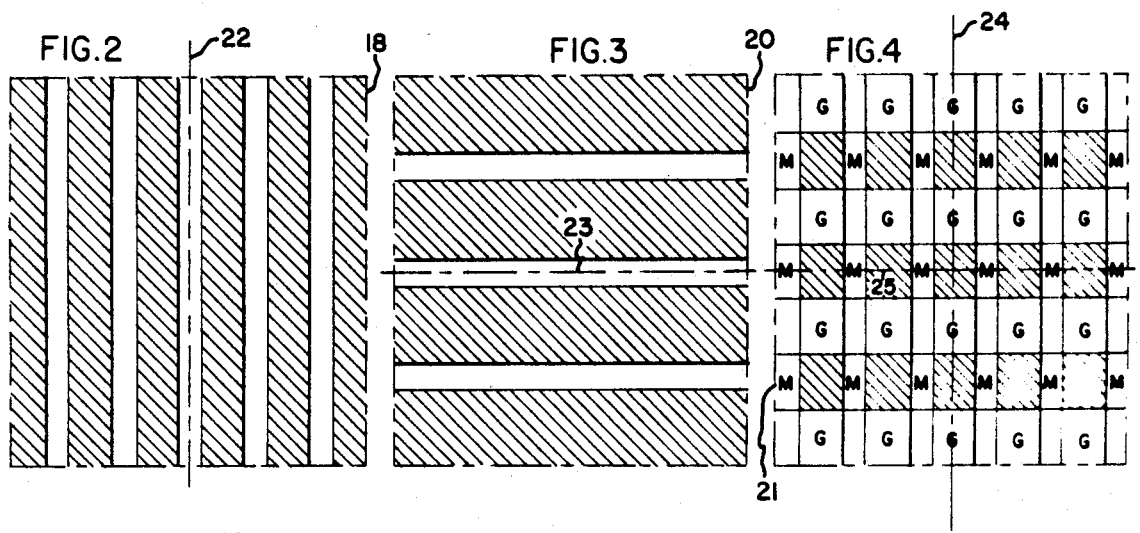
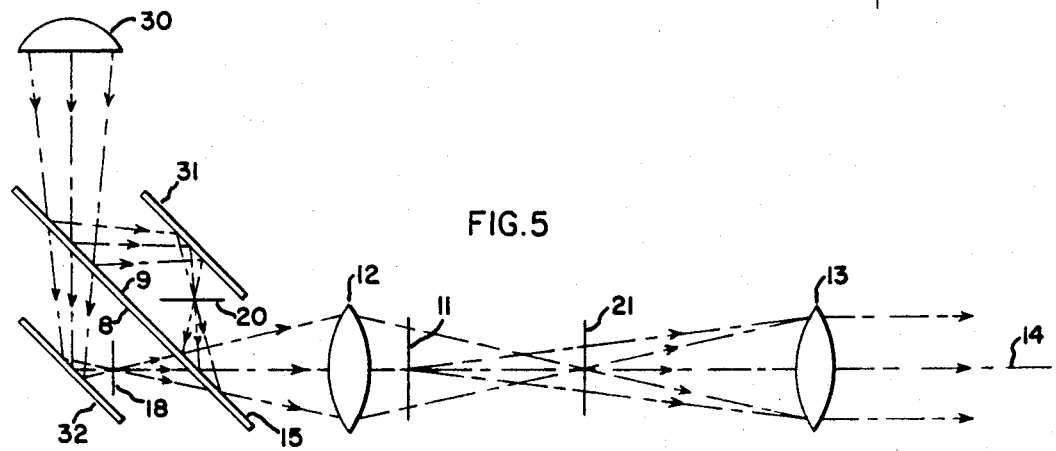
INVENTOR:
LAWRENCE A. JUHLIN, JR.
BY Marvin Snyder
HIS ATTORNEY.

LIGHT VALVE PROJECTION SYSTEM EMPLOYING COAXIAL BEAMS OF COLORED LIGHT

INTRODUCTION

This invention relates to light valves for optically projecting, in color, images generated electronically on a light controlling layer, and more particularly to a method and apparatus for improving optical qualities of images thus projected.

One form of light valve suitable for optical projection of electronically generated images onto a remote display surface comprises and evacuated enclosure containing an electron gun in predetermined alignment with a transparent disc. The disc is rotated through a reservoir of light modulating fluid to deposit a continuously replenished layer of fluid on the disc surface. An electron beam, generated by the electron gun, is directed through electrostatic beam deflecting and focusing means and is scanned across a portion of the light modulating fluid layer so as to selectively deform the layer. The fluid deformations thus formed constitute optical diffraction gratings which, in conjunction with a Schlieren optical system, selectively control passage of light from a light source through the disc and through an output window in the enclosure envelope in order to create visible images at a remote display surface on which the light impinges.

In particular, diffraction gratings are formed by directing the electron beam onto the fluid layer and horizontally deflecting the beam across the surface of the layer in successive, substantially parallel paths. By velocity modulating the beam with signals corresponding to two primary colors, typically red and blue, the speed of horizontal deflection along these paths is varied in a periodic manner at a frequency considerably greater than the frequency of occurrence of each scan line or parallel path, producing vertically directed diffraction gratings corresponding to the red and blue signals, respectively. In addition, horizontally directed diffraction gratings, corresponding to the green signal, are formed by the horizontal scan lines or parallel paths of the scanning electron beam. The horizontally directed diffraction gratings are wobble modulated; that is, the size of the spot formed by the beam is varied in accordance with green signal modulation.

To enable projection of three primary colors from a common layer of viscous fluid, the line-to-line spacing of each diffraction grating formed on the fluid layer produces a specific angle of light deviation unique to any given color impinging on the fluid layer. Light emerging from the diffraction gratings is directed onto an output mask having apertures therein of predetermined extent and at predetermined locations in order to pass the primary colors selected to be projected. The line-to-line spacing of each of the three primary color diffraction gratings is used to determine the correct width and location of the cooperating slot in the output mask to pass the respective primary color when a diffraction grating corresponding to production of that color has been formed in the fluid layer. Depth of fluid layer deformation in each diffraction grating is varied in accordance with density of charge deposited by the electron beam so as to produce corresponding variations in intensity of light passed by the diffraction grating. A system of this type is described and claimed in W. E. Good et al. U.S. Pat. No. 3,325,592, issued June 13, 1967 and assigned to the instant assignee.

In employing light valve projectors of the type described above, full utility of the Schlieren optical system may be readily realized if, instead of white light impinging on the entire surface of the deformable medium, only the primary colors used in the displayed image be made to impinge thereon. This is conventionally accomplished by use of color filters, which are optically transmissive or transparent only to light of predetermined color. However, this type of system has heretofore required that the green light originate from a different location than the red and blue light. For example, in the system of the aforementioned Good et al. patent, a color filter for passing magenta light through a central zone and green light through a pair of zones on either side of the central zone is employed. While a system of the type described in the Good et al. patent provides satisfactory images for display, the present invention is directed to a method and apparatus for even further improving quality of the displayed image.

Accordingly, one object of the invention is to improve color uniformity and reduce vignetting of displayed images in a light valve optical projection system.

Another object is to reduce field angle requirements for the Schlieren lens of a light valve optical projection system.

Another object is to improve color purity in the image displayed by a light valve optical projection system.

Another object is to achieve uniform illumination of a light modulating medium with separate sources of different colored light.

Another object is to permit independent matching of curvature of Schlieren optical input masks for different colors to the Schlieren lens curvature of field in a light valve optical projection system.

Briefly, in accordance with a preferred embodiment of the invention, a light valve system for projecting images in color comprises a light modulating medium containing an image to be displayed on a remote display screen. A dichroic mirror is situated at a finite angle other than the normal with respect to the plane of the image contained by the light modulating medium so as to enable light of one color to pass through the mirror toward the medium and light of another color to be reflected from the mirror toward the medium coaxially with the light of the one color.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a schematic diagram of one embodiment of the invention wherein illumination is provided by two separate light sources;

FIG. 2 is a plan view of a first input mask segment for use in the present invention;

FIG. 3 is a plan view of a second input mask segment for use in the present invention;

FIG. 4 is a plan view of an output mask segment for use in the present invention; and FIG. 5 is a schematic diagram of a second embodiment of the invention wherein illumination is provided by a single white light source.

DESCRIPTION OF TYPICAL EMBODIMENTS

In FIG. 1, a substantially planar light-modulating medium 11 is shown situated between a pair of lenses 12 and 13 and oriented normal to their optic axis 14. A first source 16 of light of a first color directs light rays along optic axis 14 toward a dichroic mirror 15 having parallel major surfaces 8 and 9 situated at a finite angle other than the normal with respect to optic axis 14 between light source 16 and lens 12. Either or both of surfaces 8 and 9 may comprise the dichroic reflecting surfaces of mirror 15. Dichroic mirror 15 is selected to be transparent to light of the first color received from light source 16 and reflective to light of a second color received from a second light source 17. Light source 17 is positioned so that rays therefrom, reflected by dichroic mirror 15 toward modulating medium 11, travel coaxially with the light rays from light source 16 along optic axis 14.

Light modulating medium 11 preferably comprises a deformable medium in which substantially orthogonal diffraction gratings are formed by the action of a scanning electron beam impinging thereon. A system in which diffraction gratings of this type are formed is described, inter alia, in W. E. Good et al. U.S. Pat. No. 3,272,917, issued Sept. 13, 1966 and assigned to the instant assignee. As a result of the gratings formed on medium 11, red and blue light is deviated by means of vertically oriented diffraction gratings in the medium and green light is deviated by virtue of horizontal diffraction gratings in the medium.

In order to make the selection of color of light passed by deformable medium 11 more precise, a pair of input light masks 18 11 20 are employed between dichroic mirror 15 and light sources 16 and 17, respectively. Assuming light source 16 is of magenta color and light source 17 is of green color, then input mask 18 preferably comprises a plurality of optically opaque vertical bars, with adjacent bars separated from each other by a vertical slot, while input mask 20 comprises a plurality of optically opaque horizontal bars, with adjacent bars separated from each other by a horizontal slot. This permits passage of vertical stripes of magenta light and horizontal stripes of green light, which become merged and superimposed upon reaching medium 11 so that the diffraction gratings in medium 11 are entirely illuminated by both magenta and green light. The configuration of each of input masks 18 and 20 may be determined from the mask segments illustrated in FIGS. 2 and 3, respectively, wherein the cross-hatched regions represent optically opaque bars and the open regions represent slots. In each of FIGS. 2 and 3, a centerline 22 and 23, respectively, is illustrated to represent the axis of symmetry of each of masks 18 and 20, respectively.

Between deformable medium 11 and output lens 13 of FIG. 1, an output light mask 21 is employed. This mask, which is situated at the focus of Schlieren lens 12, permits construction of a dark field for any color by presenting opaque regions to light of the particular color or colors deviated by the diffraction gratings in deformable medium 11. A segment of output mask 21 is illustrated in FIG. 4, with centerlines 24 and 25 to illustrate axes of symmetry thereof. In mask of FIG. 4, the regions designed G comprise green filters so as to be transparent to green light but opaque to magenta light. The regions marked M comprise magenta filter regions so as to be opaque to green light but transparent to magenta light. The remaining open regions without any letter designation are open, or optically transparent, and the cross-hatched regions are optically opaque. Thus, output mask 21 comprises alternate opaque and transparent columns in the vertical direction, with respect to magenta light superimposed upon alternate opaque and transparent rows in the horizontal direction, with respect to green light. Light emergent from medium 11, when the medium is undeformed, is focused by lens 12 so that all of the vertical stripes of magenta light and horizontal stripes of green light fall on mask 21, with the vertical stripes of magenta light falling on the columns opaque to magenta and the horizontal stripes of green light falling on the rows opaque to green. Under these conditions, light is prevented from passing mask 21.

In operation, diffraction gratings are continually produced on the surface of deformable medium 11 by the action of an electron beam (not shown) thereon. Information required to obtain the desired image display on a remote screen is thus imparted to medium 11. Magenta light from light source 16 passes through input mask 18 and dichroic mirror 15 and impinges on deformable medium 11 so as to be intensity modulated by medium 11 in accordance with the image to be displayed. At the same time, green light from light source 17 passes through input mask 20 and is reflected by dichroic mirror 15 onto the surface of deformable medium 11 so as to be intensity modulated by medium 11 in accordance with the image to be displayed. Dichroic mirror 15 is positioned with respect to light sources 16 and 17 so that the magenta light transmitted through mirror 15 and the green light reflected from mirror 15 are superimposed and directed coaxially along optic axis 14 onto deformable medium 11. In this manner, medium 11 is uniformly illuminated by both the magenta and green light.

Additive primary colors comprising red, blue and green light emanate from deformable medium 11 at fixed angles, respectively, other than the normal with respect to the plane of output mask 21, because of presence of corresponding diffraction gratings formed on medium 11, the red and blue light being constituents of the magenta light. These fixed angles, in turn, are determined by the line spacings in each of the diffraction gratings, respectively. The portions of the additive primary colors which are thus deviated past the opaque regions of output light mask 21 are then directed onto a remote screen (not shown) by projector lens 13 so as to construct the displayed image thereon. True colors of the image are produced by selective overlapping of the red, blue and green light where required.

Output mask 21, as shown in FIG. 4, is constructed so as to transmit uninterrupted rows of green light, by virtue of its rows of green filters separated by open regions, or to achieve a dark field condition for green by entirely blocking the horizontal rows of green light, by virtue of its rows of optically opaque regions separated by magenta transmissive regions which are opaque to green light, depending upon the intensity of green light deviated by the horizontal diffraction gratings in medium 11. In similar fashion, output light mask 21 permits vertical columns of red and blue light, the constituents of magenta light, to pass through its vertical columns comprised of alternate open areas and magenta filter regions, depending upon the intensity of red and blue light, respectively, deviated by the vertical diffraction gratings in medium 11. Undeviated red or blue light falls onto the vertical columns of output mask 21 comprised of alternate green transmissive and optically opaque regions and is thereby blocked over its entire vertical extent since the green filter regions are opaque to both red and blue light, achieving a dark field condition for red or blue light, respectively. Consequently, the red and blue light have their own set of alternate vertical transparent and opaque columns in output mask 21, while the green light has its own set of alternate horizontal transparent and opaque rows in the output mask.

As illustrated by the system of FIG. 1, there is no need to relegate green light to one region of the object and image fields of lens 12 and direct magenta light onto the other regions of these fields since the image field comprises two separate but optically superimposed fields. This reduces stringency of field angle requirements for Schlieren lens 12 or, in the alternative, results in better light utilization of the original field. Moreover, color uniformity is improved and a concomitant reduction in vignetting is obtained due to the resulting coaxial and superimposed bundles of green and magenta light rays. In addition, a repeated color separation takes place at dichroic mirror 15, resulting in improved color purity; that is, the magenta light produced by light source 16 is filtered by dichroic mirror 15 so that any visible light which may happen to be present, other than magenta, is reflected away by mirror 15. Furthermore, mirror 15 reflects only the green light received from light source 17 toward deformable medium 11, and passes any visible light, other than green, through the mirror and away from optic axis 14. Therefore, while color separation occurs at each of light sources 16 and 17, it occurs a second time at dichroic mirror 15 for each of the magenta and green colors. Those skilled in the art will also recognize that input masks 18 and 20 may be independently curved in order to match the curvature of field of Schlieren lens 12, if necessary. By employing two separate input masks, establishing a predetermined curvature on either of the input masks fails to affect light passing through the other of the input masks in any manner whatever.

FIG. 5 illustrates a second embodiment of the present invention wherein a single light source 30 is employed in place of the green and magenta light sources in the system of FIG. 1. Light source 30 emits white light onto a first location on dichroic mirror 15 situated at an angle with respect to optic axis 14. Dichroic mirror 15 performs the same selection function as in the system of FIG. 1 so that, at the first location on dichroic mirror 15, green light is reflected onto a mirror 31 while magenta light is transmitted onto a mirror 32. Mirrors 31 and 32 are positioned to face sides 9 and 8 of dichroic mirror 15, respectively, so as to reflect green light and magenta light, respectively, onto sides 9 and 8 of dichroic mirror 15, respectively, at a second location on the dichroic mirror. As in the apparatus of FIG. 1, either or both of surfaces 8 and 9 may comprise the dichroic-reflecting surfaces of mirror 15. In any event, magenta light, incident on surface 8 of dichroic mirror 15, is transmitted by dichroic mirror 15 at the second location thereon, and green light, incident on surface 9 of dichroic mirror 15, is reflected from dichroic mirror 15 at the same second location thereon. By situating mirror 32 at an angle to direct magenta light along optic axis 14 and by situating mirror 31 in a position to cause green light to be reflected from dichroic mirror 15 along optic axis 14, the rays of magenta and green light emanating from dichroic mirror 15 toward light modulating medium 11 are coaxial about optic axis 14. These light rays are directed through Schlieren lens 12 onto deformable medium 11, and the light rays diffracted thereby are passed through output light mask 21 to projector lens 13 which brings them to a focus for viewing on a remote display screen (not shown).

The construction and function of input masks 18 and 20 and output mask 21 are as described in conjunction with the system of FIG. 1. Therefore, operation of the system of FIG. 5 is essentially similar to operation of the system of FIG. 1, with the exception that illumination originates at one light source, instead of two. Moreover, the same advantages enumerated for the system of FIG. 1 accrue to the system of FIG. 5. As in the system of FIG. 1, two color separations take place in producing each of the magenta and green colors, since the first separation occurs at the first location on dichroic mirror 15, where white light rays from light source 30 impinge, while the second separation takes place at the second location on dichroic mirror 15, from which the combined rays of magenta and green light emanate. Alternatively, dichroic mirror 15 could be two separate dichroic mirrors, with the first location being on one dichroic mirror and the second location being on the other dichroic mirror.

Still further separation of colors may be obtained by making mirrors 31 and 32 dichroic. Mirror 31, in this case, would be of the same type as mirror 15 so as to reflect green light and transmit magenta light, while dichroic mirror 32 would be of a complementary type in that it would reflect magenta light and transmit green light. However, regardless of whether mirrors 31 and 32 are of the fully reflective, conventional type, or of the dichroic type, operation of the portion of the system of FIG. 5 which is illuminated by light emanating from the second location on dichroic mirror 15 coaxially with optic axis 14 is essentially identical to operation of the corresponding portion of the system of FIG. 1.

The foregoing describes a light valve projection system employing coaxially directed rays of colored light in which color uniformity of displayed images is improved and vignetting of displayed images is reduced. The system reduces field angle requirements for the Schlieren lens of a light valve optical projection system while providing uniform illumination of the light modulating medium thereof. Color purity in the displayed images is thereby improved, and independent matching of curvature of the Schlieren optical input masks to the Schlieren lens field curvature for different colors is facilitated.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

1. In a system for projecting images in color by passing light through optical diffraction gratings formed in a substantially planar, deformable medium, said gratings being generally directed along first and second substantially orthogonal directions, means for improving quality of images produced by said system, comprising:

dichroic means situated at a finite angle other than the normal with respect to the plane of said medium, said dichroic means being transparent to light of a first color and reflective to light of a second color;

means situated to direct stripes of light of said first color along an optic axis onto said gratings through a predetermined area on said dichroic means, said stripes of light of said first color being longitudinally directed along said first direction;

means situated to direct stripes of light of said second color onto said predetermined area on said dichroic means so as to enable said light of said second color to be reflected onto said gratings from said dichroic means along said optic axis, said stripes of light of said second color being longitudinally directed along said second direction; and an output light mask situated in the path of light emanating from said gratings, said output light mask comprising alternate opaque and transparent regions directed longitudinally along said first direction, with respect to light of said first color, superimposed upon alternate opaque and transparent regions directed longitudinally along said second direction, with respect to light of said second color.

2. In a system for projecting images in color by passing light through optical diffraction gratings in a substantially planar medium, said gratings being generally directed along first and second substantially orthogonal directions so as to define an image to be projected, means for improving quality of images produced by said system, comprising:

dichroic means having two substantially parallel surfaces situated at a finite angle other than the normal with respect to the plane of said medium, said dichroic means being transparent to light of a first color and reflective to light of a second color;

means situated to direct light of said first color along an optic axis onto said medium by passing light of said first optic axis, incident on one of said surfaces of said dichroic means, through a predetermined area on the opposite surface of said dichroic means;

means situated to direct light of said second color onto said predetermined area on the opposite surface of said dichroic means at an angle other than the normal with respect thereto so as to reflect light of said second color from said dichroic means along said optic axis onto said medium;

a first plurality of alternate bars and slots being respectively opaque and transparent to light of said first color and being situated along said optic axis in the path of light of said first color falling upon said dichroic means, said first plurality of bars and slots having longitudinal axes directed along said first direction;

a second plurality of alternate bars and slots being respectively opaque and transparent to light of said second color and being situated in the path of light of said second color falling upon said dichroic means, said second plurality of bars and slots having longitudinal axes directed along said second direction; and an output light mask situated in the path of light emanating from said medium, said output light mask comprising alternate opaque and transparent regions directed longitudinally along said first direction, with respect to light of said first color, superimposed upon alternate opaque and transparent regions directed longitudinally along said second direction, with respect to light of said second color.

3. The system of claim 2 wherein said means situated to direct light of said first color onto said medium comprises a source of light of said first color, and said means situated to direct light of said second color onto said predetermined area on the opposite surface of said dichroic means comprises a source of light of said second color.

4. The system of claim 2 wherein said means situated to direct light of said first color onto said medium comprises a source of white light directed onto said opposite surface of said dichroic means, and first reflective means situated to face said one surface of said dichroic means, said first reflective means receiving light of said first color from said source of which light through said dichroic means and directing said light of said first color onto said one surface of said dichroic means so as to pass through said predetermined area on the opposite surface of said dichroic means, and wherein said means situated to direct light of said second color onto said predetermined area on the opposite surface of said dichroic means comprises second reflective means situated to face said opposite surface of said dichroic means, said second reflective means receiving light of said second color from said white light as reflected by said dichroic means and directing said light of said second color onto said opposite surface of said dichroic means so as to be reflected at said predetermined area on the opposite surface of said dichroic means.